United States Patent [19]

Murtagh

[11] Patent Number: 4,596,485
[45] Date of Patent: Jun. 24, 1986

[54] DEVICE FOR FORMING A MITERLESS JOINT

[76] Inventor: John Murtagh, 130 Bergen Ave., Ridgefield Park, N.J. 07660

[21] Appl. No.: 740,810

[22] Filed: Jun. 3, 1985

[51] Int. Cl.[4] ............................................... F16B 1/00
[52] U.S. Cl. .................................... 403/205; 403/403
[58] Field of Search ....................... 403/205, 403, 402

[56] References Cited

U.S. PATENT DOCUMENTS

| | | | |
|---|---|---|---|
| 4,421,434 | 12/1983 | Magner | 403/205 X |
| 4,477,201 | 10/1984 | Yoshiyuji | 403/205 X |

FOREIGN PATENT DOCUMENTS

| | | | |
|---|---|---|---|
| 2011054 | 9/1971 | Fed. Rep. of Germany | 403/205 |
| 355770 | 1/1938 | Italy | 403/205 |

*Primary Examiner*—Andrew V. Kundrat
*Attorney, Agent, or Firm*—Bacon & Thomas

[57] ABSTRACT

A device for forming a miterless joint from two moulding strips, including a solid member defined by a pair of legs configured and angled for flush engagement against a corner formed by two intersecting wall surfaces, each leg including a free end terminating in a socket for receiving the corresponding ends of the moulding strips.

8 Claims, 5 Drawing Figures

U.S. Patent   Jun. 24, 1986   4,596,485
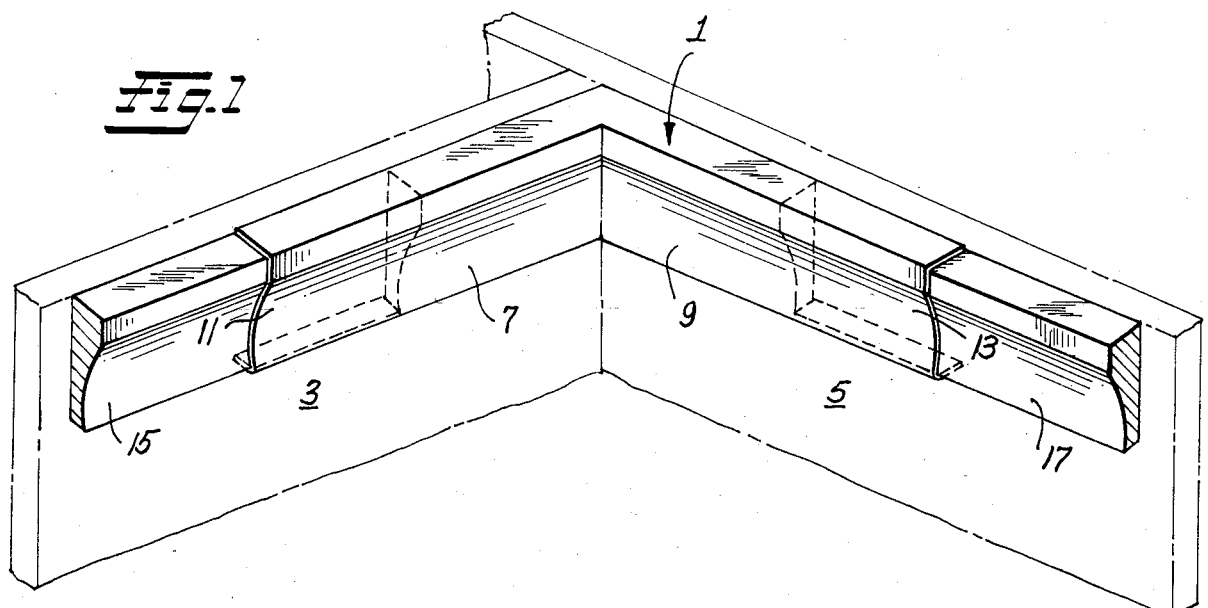
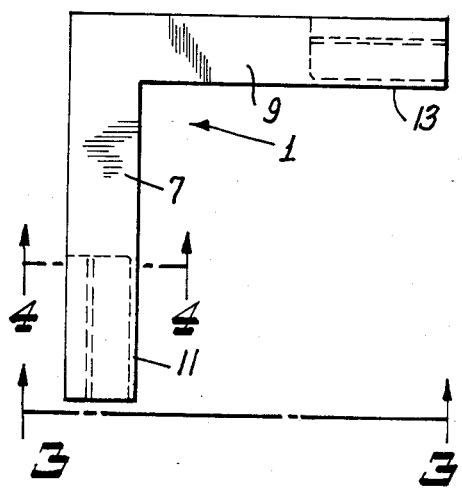
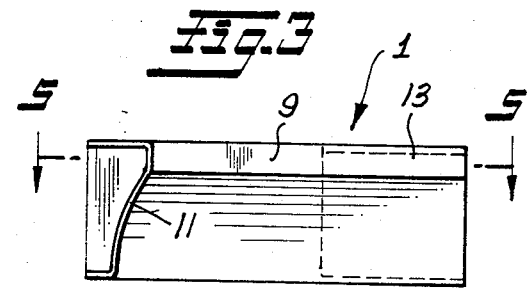
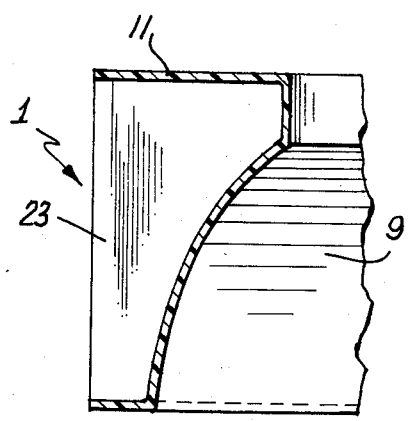
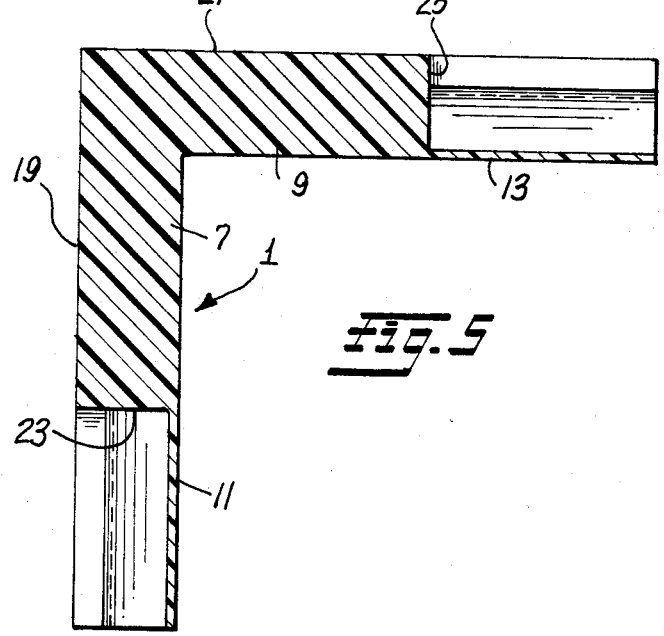

DEVICE FOR FORMING A MITERLESS JOINT

BACKGROUND OF THE INVENTION

1. Field of the Invention

The present invention generally involves the field of technology pertaining to carpentry devices for forming a joint from moulding strips. More specifically, the invention comprises an improved device for forming a moulding joint without the need for making corresponding miter cuts at the ends of the moulding strips.

2. Description of the Prior Art

It is well known in the building construction field of technology to apply strips of moulding at the intersections of the ceiling, walls and floor of a room for the purpose of concealing the intersections and providing a decorative finished appearance thereto. The moulding strips may be of various configurations and designs. The joining of adjacent corresponding ends of moulding strips at an inside or outside corner formed by the intersecting surfaces normally involves making miter cuts at the ends of the moulding strips so that the cut surfaces of the strips will abut to dispose the strips at the desired angular disposition defined by the corner. A corner formed by the abutting miter cut ends of adjacent moulding strips is known as a mitered joint. The making of miter cuts at the ends of corresponding moulding strips to form a mitered joint is both time consuming and expensive. Moreover, specialized equipment and a certain degree of carpentry skill are required in order to form a perfect mitered joint that appears to be a seamless continuation of the moulding strip configuration.

The prior art has recognized the difficulties and problems associated with the formation of perfect mitered joints from moulding strips and has therefore proposed devices whereby a miterless joint, particularly a 90° inside or outside corner joint, may be formed without the need for providing miter cuts on the adjacent ends of the strips. Some examples of such known devices for this purpose are disclosed by the Salada U.S. Pat. No. 205,425, Jackson U.S. Pat. No. 1,830,108, Swendsen et al U.S. Pat. No. 2,069,289, Hillmann U.S. Pat. No. 2,915,794, and Pheifle U.S. Pat. No. 2,921,352.

SUMMARY OF THE INVENTION

It is an object of the invention to provide an improved device for forming a joint with two moulding strips without the necessity of providing miter cuts on the corresponding ends of the strips.

It is another object of the invention to provide an improved device for forming either an inside or outside miterless corner joint.

It is a further object of the invention to provide an improved device for forming a miterless corner joint wherein the device is economical to manufacture and easy to use.

It is still another object of the invention to provide an improved device for forming a perfect miterless corner joint wherein the device is simple in construction and has a high degree of structural integrity so that the joint formed therefrom is characterized by both structural and cosmetic longevity.

These and other objects of the invention are realized through the device of the invention wherein there is provided a solid member defined by a pair of leg portions disposed at an angle and configured to both conform and engage flush against the portions of the intersecting surfaces to be concealed by the finished joint. Each leg portion includes a free end terminating in a socket for receiving the corresponding ends of two moulding strips, the cross-sectional configurations of the sockets and their associated leg portions corresponding to the cross-sectional configurations of the moulding strips. The device may be attached to the intersecting surfaces by any suitable means, including adhesive or mechanical fasteners, or maintained thereagainst by securing the moulding strips to their respective surfaces through conventional means.

The device is preferably integrally formed from plastic material, with the internal sections of the sockets being open to permit flush engagement of the moulding strips against their corresponding surfaces. The leg portions are preferably disposed at an inwardly or outwardly directed right angle to conform to, respectively, inside and outside corner joints, but may also be of any other angle, depending upon the angular disposition of the intersecting surfaces against which the joint is to be formed.

Other objects and advantages of the invention shall become apparent from the following detailed description thereof, when taken in conjunction with the drawings wherein like reference characters refer to corresponding parts of the several views.

BRIEF DESCRIPTION OF THE DRAWINGS

FIG. 1 is a perspective view of a device for forming a miterless joint according to a preferred embodiment of the invention and shown in the configuration of an inside corner with two moulding strips inserted into the sockets thereof;

FIG. 2 is a plan view of the device of FIG. 1, but shown with the moulding strips removed;

FIG. 3 is an end view of the device of FIG. 2 shown in the direction indicated by the line 3—3;

FIG. 4 is an enlarged fragmentary vertical sectional view, taken on the line 4—4 of FIG. 2; and FIG. 5 is a fragmentary horizontal sectional view, taken on the line 5—5 of FIG. 4, particularly showing the solid construction of the leg portions.

DETAILED DESCRIPTION OF THE PREFERRED EMBODIMENT

A device 1 for forming a miterless joint in accordance with a preferred embodiment of the invention shall now be described with initial reference to FIG. 1. As shown therein, device 1 is attached to the surfaces of two adjacent intersecting walls 3 and 5 which define an inside 90° corner therebetween. Device 1 is of solid construction and includes a pair of leg portions 7 and 9 disposed at an angle corresponding to the corner angle formed by walls 3 and 5. Leg portions 7 and 9 are each provided with free ends which terminate in, respectively, a pair of sockets 11 and 13. A pair of moulding strips 15 and 17 are shown with their ends inserted within sockets 11 and 13, respectively.

As apparent from FIG. 1, the cross-sectional configurations of leg portions 7 and 9, and their corresponding sockets 11 and 13, are the same as the cross-sectional configurations of their respective associated moulding strips 15 and 17. Though device 1 is shown configured for use at an inside 90° corner formed by walls 3 and 5, it is understood that device 1 can be reversed in configuration so as to be utilized with an outside 90° corner. Moreover, leg portions 7 and 9 may also be disposed at any angle for the purpose of accommodating any angle defined by the intersecting walls against which device 1 is to be installed.

The structural characteristics of device 1 shall now be described in detail with particular reference to FIGS. 2-5. As shown therein, an important and advantageous aspect of the invention resides in leg portions 7 and 9 being of solid integral construction preferably molded from plastic material. This solid construction has been discovered to provide significant structural integrity to device 1, particularly during its installation, and also provides longevity in overall appearance. It shall also be noted that the rear sections of leg portions 7 and 9 are provided with intersecting surfaces 19 and 21, respectively, which extend across substantially the entire rear sections thereof. As apparent in FIG. 1, surfaces 19 and 21 correspond to the surfaces of walls 3 and 5 for smooth flush engagement thereagainst, thereby providing a solid finished appearance to device 1.

The respective free ends of leg portions 7 and 9 are defined by abutment surfaces 23 and 25 against which the ends of corresponding moulding strips 15 and 17 are abutted. As particularly apparent from FIGS. 4 and 5, sockets 11 and 13 extending outwardly from their corresponding abutment surfaces 23 and 25 are completely open at their rear portions in order to permit the back surfaces of moulding strips 15 and 17 to achieve a smooth flush engagement against walls 3 and 5. It is also preferred that the entire device 1, including leg portions 7, 9 and sockets 11, 13 be integrally formed of plastic material.

The cross-sectional configurations of leg portions 7, 9 and their associated sockets 11, 13 may of course vary in accordance with the cross-sectional configurations of the moulding strips utilized. It is preferred that the thickness of the wall sections forming sockets 11 and 13 be maintained thin in order to provide a smooth and substantially seamless transition from device 1 to moulding strips 15 and 17. Device 1 may be formed in the same color as the finished painted color of its associated moulding strips or, alternatively, have its exterior surfaces painted along with the moulding strips.

The manner in which device 1 may be installed to form a miterless joint with moulding strips 15 and 17 may be accomplished in different ways. For example, device 1 may be initially attached to the corner defined by walls 3 and 5 by applying adhesive to surfaces 19 and 21. Alternatively, device 1 may be secured by using nails or other suitable mechanical fasteners which are driven through leg portions 7 and 9 and into their corresponding walls 3 and 5. Thereafter, moulding strips 15 and 17 may be inserted into their respective sockets 11 and 13, and secured in position against walls 3 and 5 in any conventional manner, such as by nailing. It is also conceivable that device 1 be held in its final position of use without any attachment means other than the attachment of moulding strips 15 and 17 to walls 3 and 5.

It is therefore apparent that a strong miterless joint, defined by leg portions 7 and 9 of device 1 is provided without the need for making any miter cuts on the ends of moulding strips 15 and 17 prior to their insertion into respective sockets 11 and 13. The solid construction of leg portions 7 and 9 not only affords enhanced structural integrity of the finished joint, but also permits their secure attachment by utilizing either adhesive or mechanical fasteners.

It is to be understood that the form of the invention herein shown and described is to be taken as merely a preferred embodiment of the same, and that various changes in the shape, size and arrangement of parts may be resorted to without departing from the spirit of the invention or scope of the subjoined claims.

I claim:

1. A device for forming a miterless joint from a pair of moulding strips at a corner angle defined by intersecting walls, which device comprises:
   (a) a pair fo solid leg portions disposed at an angle corresponding to the corner angle formed by the intersecting walls;
   (b) each leg portion including a surface extending across substantially the entire rear portion thereof for flush engagement against the surface of a corresponding wall, wherein the surfaces of the leg portions intersect at an angle corresponding to the corner angle;
   (c) each leg portion terminating in a socket for receiving the end of a moulding strip therein; and
   (d) each socket being open at its rear portion for permitting flush engagement of the back of the moulding strip against the surface of its corresponding wall.

2. The device of claim 1 wherein each leg portion includes an abutment surface for engagement by the end of its corresponding moulding strip.

3. The device of claim 1 wherein the entire device is integrally formed of plastic material.

4. The device of claim 1 wherein each leg portion and its socket have a common cross-sectional configuration corresponding to the cross-sectional configuration of the moulding strip.

5. The device of claim 1 wherein the leg portions are disposed at a 90° angle.

6. The device of claim 5 wherein the leg portions are configured to form an inside corner joint.

7. The device of claim 5 wherein the leg portions are disposed to form an inside corner joint.

8. The device of claim 5 wherein the leg portions are disposed to form an outside corner joint.

* * * * *